UNITED STATES PATENT OFFICE.

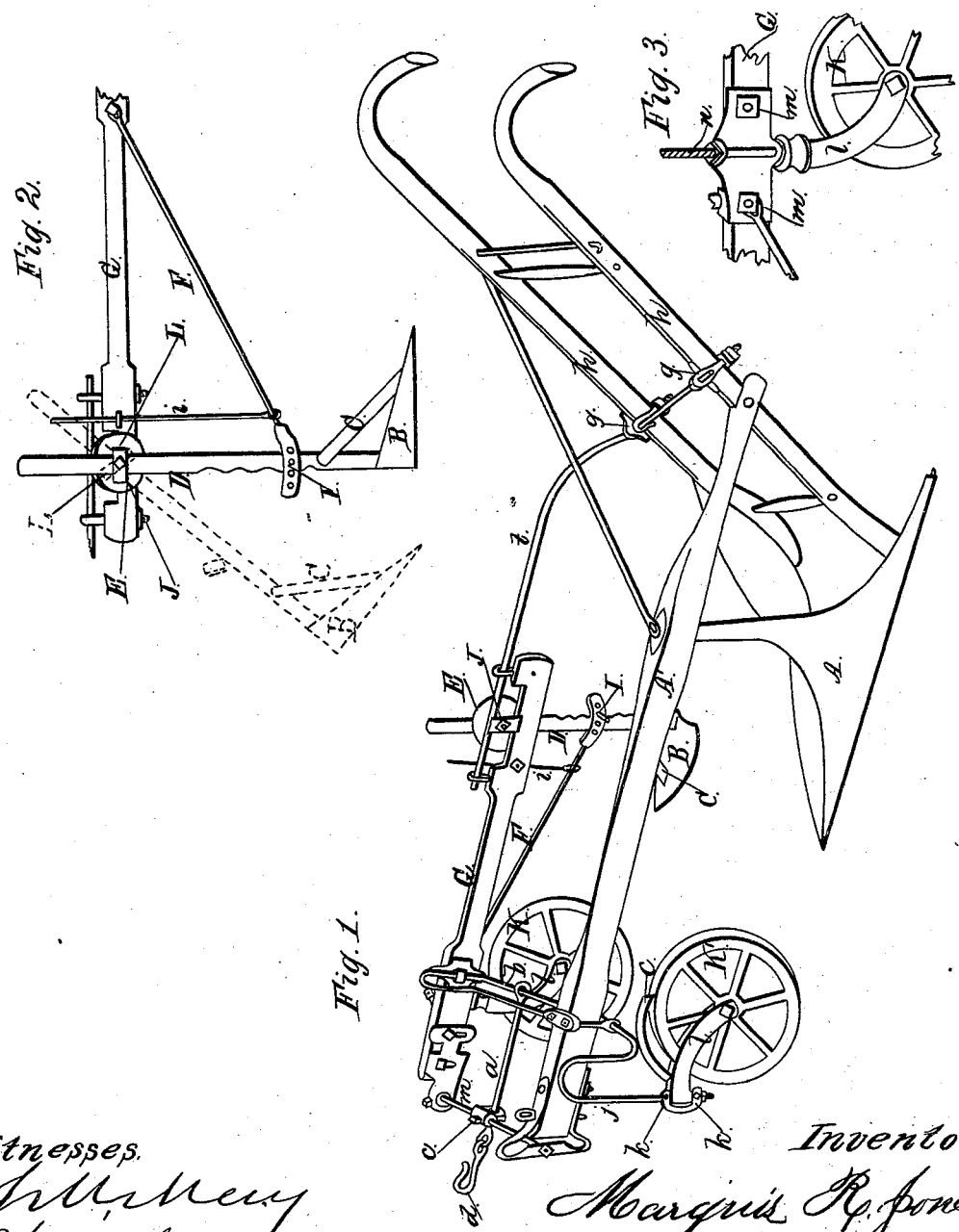

MARQUIS R. JONES, OF WALWORTH COUNTY, WISCONSIN.

IMPROVEMENT IN SUBSOIL-PLOWS.

Specification forming part of Letters Patent No. 110,660, dated January 3, 1871; antedated December 31, 1870.

*To all whom it may concern:*

Be it known that I, MARQUIS R. JONES, of Walworth county, in the State of Wisconsin, have invented a new and useful Improvement in Subsoil-Plows and in a Device for Making a Common Plow and Subsoil-Plow Self-Holding; and I do hereby declare that the following is a full and exact description thereof, reference being had to the accompanying drawings, and to the letters of reference marked thereon, the same letter in each figure representing the same part.

The nature of my invention consists in the construction of a standard of a subsoil-plow made with its rear edge serrated or notched, when said standard is used in combination with a brittle pin and draft-rod, as hereinafter specified; also, in the construction and connection of the plow-beam, caster-wheel, and axle, with extension of said axle, and set-screws for effecting the vertical adjustment of the caster-wheel.

Figure 1 is a perspective view; and Figs. 2 and 3 are sectional drawings.

A is the common plow. A' is the beam, and B is the share; D, the post, and C is the sharp-edged brace, of the subsoil-plow. In Fig. 2 the subsoil-plow is more fully shown, while in Fig. 1 its connection with a common plow is shown.

To beam G is attached one end of draft-rod F, also the plate E, to which and to the beam is fastened post D by means of clasp L, which incloses the post in such a manner as to allow the post to pass through it, and is gripped to the plate by means of the screw and nut J on the opposite side of the beam from the plate. This is for the purpose of allowing the post to be raised or lowered and fastened without a bolt passing through the post.

I is a pin, of wood or other material, that will break and permit the plow to take position similar to that shown by dotted lines when the plow meets obstruction—as a stone or a strong root—and prevents damage, besides being more convenient and a great saving of time compared with having to dig the earth to remove a stone or cut away a root or other obstruction. I do not confine myself to a pin, I, but any device that will yield and allow the post D to pass back in the mortise or fork in the end of draft-rod F. This draft-rod is held from dropping by means of supporting-rod *i*, attached to the beam in any suitable manner.

The usefulness of the brace C is twofold: First, the share B may be made of greater length than when no brace is used, giving the advantage of a sharper edge and of greater width and more wear; second, the brace being sharp on its front edge it divides the soil and makes the share pass much easier through it, especially if the soil is of a clayey nature, or is firm, saving a large percentage of power necessary to move the plow. The brace C may be fastened to the share and to the post in any suitable manner.

Beam G is kept in position relatively with beam A' by means of rod *f*, fastened to handles *h h* by clasps *g g*, which allow the rod to be moved to the right or left, as may be required, and then fastened by the bolts on the clasps. The forward end of the beam is held by rod *b*, bent or formed substantially as shown, and held by clasps to beams A' and G. Rod *b* is formed, as at *j*, to receive the attachment *l* of the caster-wheel K', which may be moved up and down to gage the depth of allowing the plow to run, and is held on rod *j* by means of set-screws *k* and *k*. The scraper *e* is to keep the earth from accumulating on the wheel. The part *j* of rod *b*, by extending from beam A', curved substantially as shown, also serves as an axle, giving a base of sufficient breadth to keep the plow A from careening, as its tendency is to do when a subsoil-plow is attached to it. The part of rod *b* between the beams serves also for the purpose of attaching draft-rod *a*, which passes through a loop on bar *m* and receives the hook *d*, and is kept in place on rod *m* by the set-screw *c*. Thus, by the arrangement of the parts substantially as shown, the common plow and the subsoil-plow may be placed nearer together or asunder, and the draft adjusted without undue lateral strain to the parts, and requiring less power to move the plows.

It will be observed that K is a caster-wheel to correspond with K', and attached to the beam G, so as to allow of being raised or lowered, as needed; also, these wheels K and K' swing or revolve to the right or left on their respective bearings, which is of value in turning to the right or left and in turning corners.

I am aware that caster-wheels have been used on reaping-machines to facilitate turning to the right and left, and do not, broadly, claim caster-wheels.

I also am aware that a pin has been used in grain-drilling machines to allow the drill-tooth to become detached from the draft-rod when obstructions are met by the breaking of the pin, and do not claim that device, broadly, but only when used in combination with a subsoil-plow.

I am aware that a subsoil-plow has been used that runs in the furrow directly after the team-horse in the furrow and before the furrow-slice that is being turned, as described in a patent issued to me and dated September 24, 1867, and I do not herein claim the position referred to of a subsoil-plow when being used; nor do I claim the manner herein described of moving a subsoil-plow toward and from a common plow, a device for so doing being also described in the patent referred to.

What I claim as my invention, and desire to secure by Letters Patent, is—

1. A standard of a subsoil-plow, with its rear edge serrated or notched, substantially as described, in combination with a brittle pin, I, and draft-rod F, when the whole are constructed and connected together, substantially as and for the purposes described.

2. Axle $j$, beam A', caster-wheel K', part $b$, and set-screws $k\ k$, when the whole are constructed and connected together, substantially as and for the purposes described.

MARQUIS R. JONES.

Witnesses:
W. H. WILLISTON,
W. S. WALKER.